Dec. 30, 1969     K. P. HILLEGASS     3,486,589

BRAKE LINING FASTENER

Filed Aug. 15, 1968     3 Sheets-Sheet 1

INVENTOR
KENNETH P. HILLEGASS

BY *Milliken*

ATTORNEY

Dec. 30, 1969 K. P. HILLEGASS 3,486,589
BRAKE LINING FASTENER
Filed Aug. 15, 1968 3 Sheets-Sheet 2

INVENTOR
KENNETH P. HILLEGASS

BY
ATTORNEY

Dec. 30, 1969
K. P. HILLEGASS
3,486,589
BRAKE LINING FASTENER
Filed Aug. 15, 1968
3 Sheets-Sheet 3
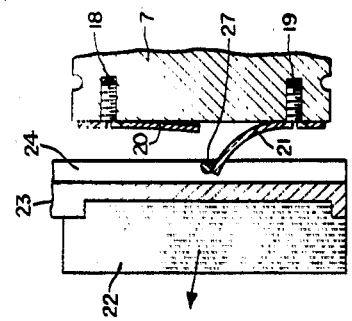
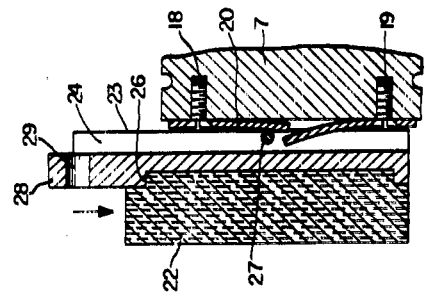
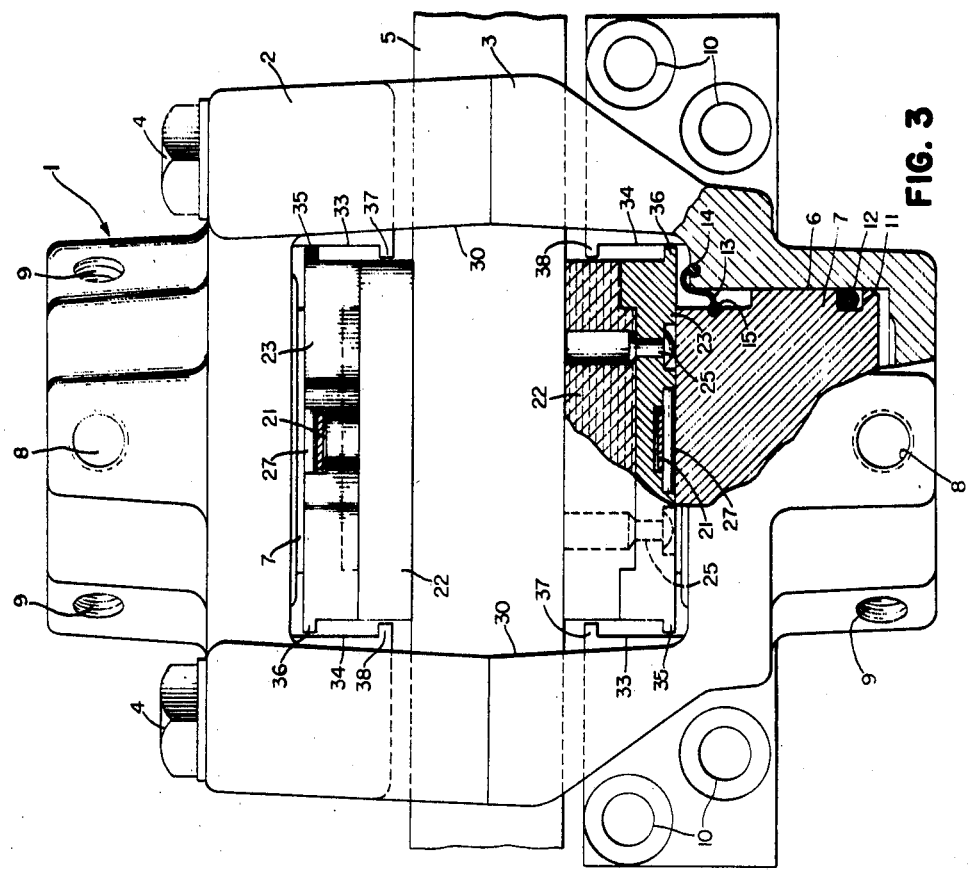
INVENTOR
KENNETH P. HILLEGASS
BY *J. M. Milliken*
ATTORNEY

United States Patent Office 3,486,589
Patented Dec. 30, 1969

3,486,589
BRAKE LINING FASTENER
Kenneth P. Hillegass, Akron, Ohio, assignor to The Goodyear Tire & Rubber Company, Akron, Ohio, a corporation of Ohio
Filed Aug. 15, 1968, Ser. No. 752,855
Int. Cl. F16d 55/02, 65/04
U.S. Cl. 188—73                     6 Claims

ABSTRACT OF THE DISCLOSURE

A fastener for attaching a lining of a disc brake to the brake piston or other carrier member in such manner that it may be readily removed from the brake housing and replaced without removing any part of the housing. The brake lining is fastened to a slotted backup plate having a retaining pin running transversely across the slot in such manner as to be held by a pair of retaining springs fastened to the outer surface of the brake piston. The pin engages the springs when the brake lining and back-up plate are inserted through an opening in the radially outer portion of the housing and moved radially inwardly until the pin passes over the free end of one spring and passes under the free end of the other spring. In order to remove the lining for replacement, the lining and back-up plate are moved axially away from the piston until the retaining pin is free of the retaining springs and then are pulled radially outwardly through the radially outer opening in the housing.

---

This invention relates to a brake lining fastener in which the brake lining can be easily removed and replaced without removing any part of the brake housing.

PRIOR ART

In the prior art, it is well-known to provide various brake structures in which the brake linings may be easily removed and replaced without removing other parts of the brake or disassembling the brake housing. In most examples in the prior art, the lining may be removed by sliding it in a circumferential direction with respect to the disc or by withdrawing it in a radial direction. The present invention involves the type of brake in which the lining is withdrawn radially from the brake housing and deals specifically with the particular manner in which the lining is fastened to the brake piston.

OBJECTS OF THE INVENTION

It is the primary object of this invention to provide a brake lining fastener for attaching a brake lining to a brake piston in such manner that it may be easily removed and replaced without removing any other parts from the brake.

Another object of this invention is to provide a manner of transmitting the brake torque from the lining to the brake housing without transmitting the torque through the brake piston.

These and other objects will become more fully apparent as the description proceeds in the following specification and the attached drawings.

BRIEF DESCRIPTION OF THE DRAWINGS

FIGURE 3 is a plan view of the brake shown in FIGURE 1 with portions broken away to more clearly show the lining fastened to the piston;

FIGURE 6 is a fragmentary cross-sectional view through a portion of the brake lining and the piston showing the manner in which one of the retaining springs on the piston deflects to permit removal of the lining;

FIGURE 7 is a fragmentary cross-sectional view similar to FIGURE 6 but showing the position of the retaining springs on the piston before the lining is moved into latched position.

DESCRIPTION OF THE PREFERRED EMBODIMENTS

Figure 1:
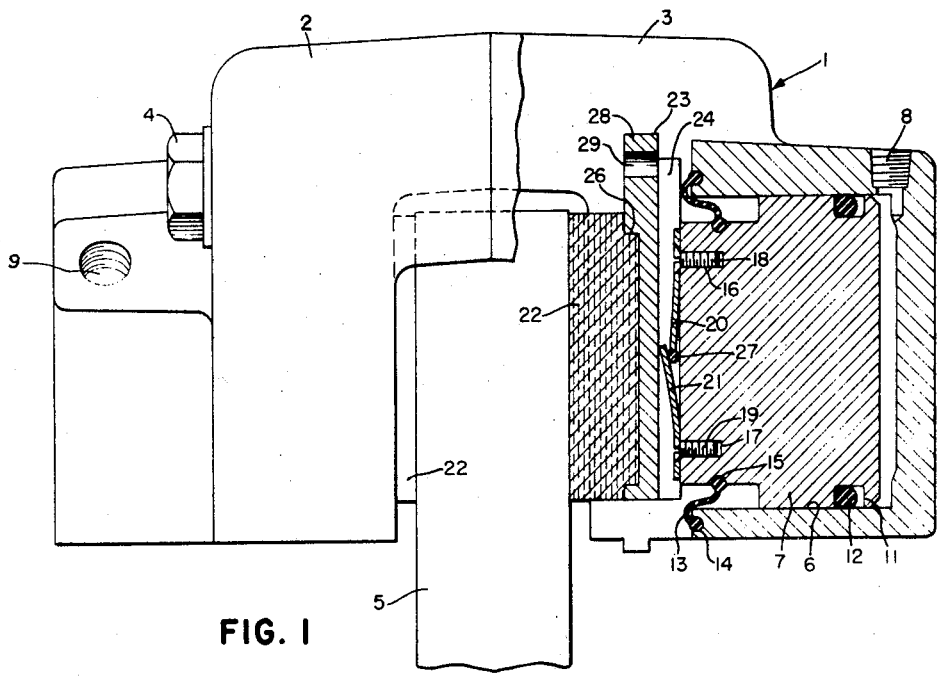
FIGURE 1 is an end elevation of a disc brake with portions broken away to show the lining fastener of the invention.
Figure 2:
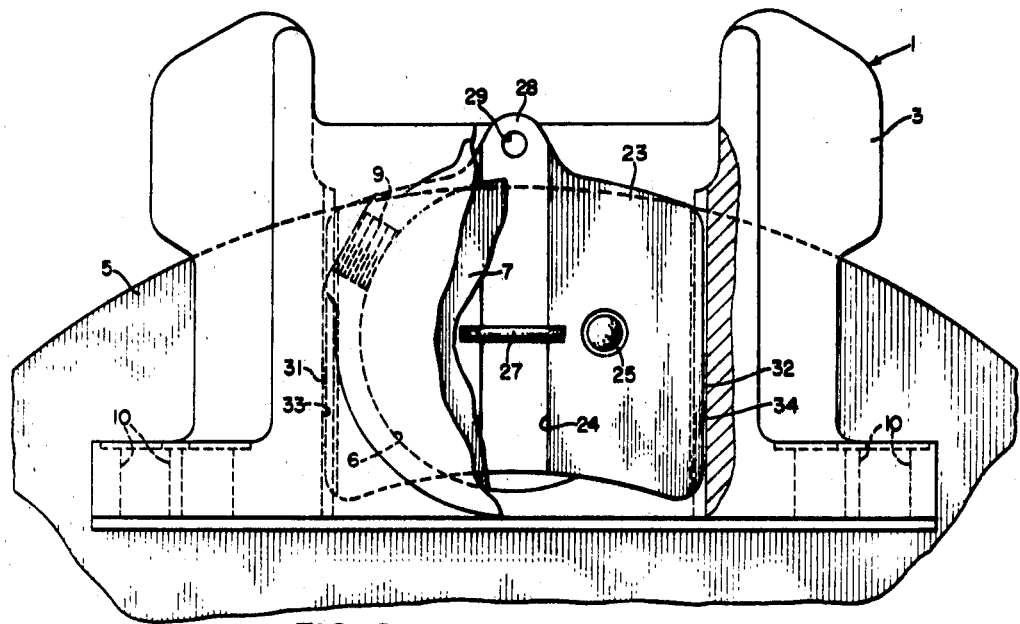
FIGURE 2 is a side elevation of the brake shown in FIGURE 1 with portions broken away to more clearly show the invention.

Referring now to the drawings and in particular to FIGURES 1 through 3, a brake assembly is indicated generally by the numeral 1. The brake assembly used to illustrate the present invention is an opposed piston type disc brake in which a piston located adjacent each opposite side of a brake disc forces its respective lining against the brake disc to impart a brake action thereto. Since this invention resides primarily in the manner of fastening the brake lining to the piston and not to the overall assembly of the brake, it will be understood that this invention could be used on other types of brake assemblies as well as the one shown herein. For example, this lining fastener could be used on a single piston brake in which either the disc is axially movable or the housing is axially movable. This fastener could also be used on most any type of disc brake having adequate clearance radially outwardly of the housing to permit withdrawal of the lining and backup plate in the radial direction.

The brake assembly 1 has a housing member 2 and an opposite housing member 3 bolted together in face-to-face relationship with a pair of bolts 4. When housing members 2 and 3 are bolted together, they form a generally C-shaped housing or caliper which extends radially inwardly on both sides of a brake disc 5. Both the housing members 2 and 3 have a brake cylinder 6 carrying a piston 7 therein. Since both the brake cylinders and pistons are substantially identical, only one will be described. Each brake cylinder 6 contains conventional inlet ports 8 and bleeder ports 9. Mounting holes 10 are provided on each side of the housing 3 for attaching it to a fixed support (not shown). The piston 7 has an annular groove 11 around the periphery thereof which carries a hydraulic seal ring 12 therein. At the outer end of the piston, a conventional flexible dust seal ring 13 is attached to annular groove 14 on the cylinder 6 and to a similar annular groove 15 around the circumference of the piston 7.

Figures 4, 5:
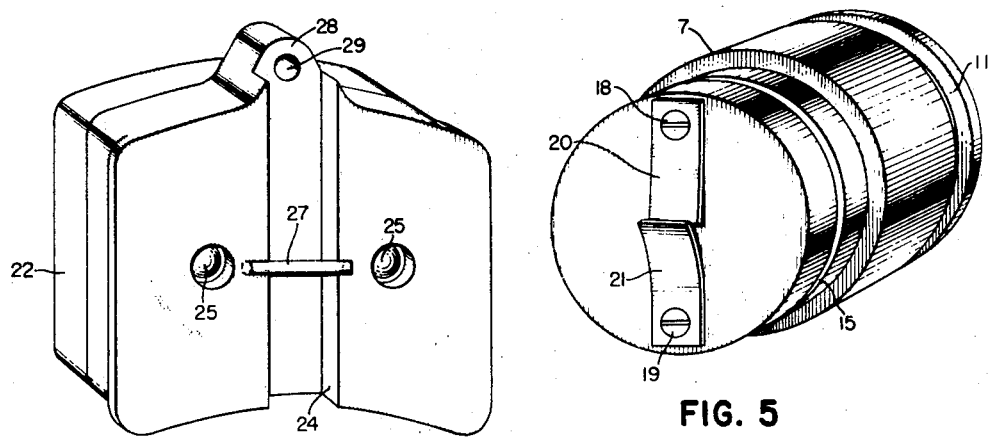
FIGURE 4 is a perspective view of a brake lining mounted on a backup plate having a transverse retaining pin.
FIGURE 5 is a perspective view of a piston to which the lining shown in FIGURE 4 is to be attached.

Referring now to FIGURES 1 and 5, the piston 7 has a pair of threaded holes 16 and 17, both of which are countersunk to receive flat head screws 18 and 19 respectively. The screw 18 passes through a flat spring 20 and secures it to the outer face of the piston 7. Similarly, a flat spring 21 is secured to the piston 7 by the screw 19. The spring 20 extends radially inwardly from the screw 18 to approximately the center of the piston 7. The spring 21 also extends radially inwardly but is of such length that it slightly overlaps the spring 20.

Referring now to FIGURES 1 and 4, the lining 22 is shown mounted on a steel back plate 23 which has a transverse slot 24 on the side opposite from the lining 22. The lining 22 is fastened to the back plate 23 by a pair of rivets 25. The back plate 23 may contain a recess 26 to receive the lining 22 and to aid in securing it more rigidly thereto and to transmit torque forces from the lining to the back plate 23. A retaining pin 27 extends transversely across the slot 24 at the center of the plate 23, and is welded to the plate 23 on each side of the slot 24 in such position that it is flush with the outer surface of the plate but is spaced from the bottom of the slot 24. Such spacing permits the spring 21 to pass between the pin 27 and the bottom of the slot 24 when the plate 23 is moved into the latch position with respect to the piston 7, as shown in FIGURE 1. The back plate 23 has an extension tab 28 containing a hole 29 at the upper edge of the plate 23 or the edge which is positioned radially outwardly when the plate 23 is assembled in the brake housing. The tab 28 aids in the removal of the plate 23 and the lining 22 by providing a member which can easily be grasped to withdraw the lining from the brake through an access opening 30 provided, as shown in FIGURE 3, in the radially outer surface of the brake housings 2 and 3.

Referring now to FIGURES 2 and 3, it may be seen that two of the lateral edges 31 and 32 bear against a pair of torque receiving surfaces 33 and 34 on the housing 3. Also provided on the lateral edges 31 and 32 are stops 35 and 36 which engage stops 37 and 38 respectively on the housing to limit the axial distance of travel of the piston 7 toward the brake disc 5. The stops will not operate, however, until the brake lining becomes sufficiently worn to allow the piston to travel a sufficient distance for the stops 35 and 36 to seat on the stops 37 and 38. It may be seen that when the springs 20 and 21 engage the pin 27 in the back plate 23, the back plate and the lining 22 may move in a limited circumferential direction when the brakes are applied. The amount of circumferential movement is limited to the clearance between the lateral edges 31 and 32 of the back plate 23 and the torque receiving surfaces 33 and 34 on the housing 3. This arrangement, as particularly shown in FIGURE 3, enables the torque from the braking action to be transmitted from the back plate 23 directly to the housing 3, and the sliding relationship between the back plate and the piston 7 prevents torque forces from being transmitted to the piston thereby cocking the piston in the cylinder or tending to impair its axial movement.

When the lining of a brake becomes worn, the back plate and the lining can be removed from the latched position shown in FIGURE 1 by moving the back plate 23 and lining 22 axially away from the piston 7, as shown in FIGURE 6. This movement deflects the spring 21 outwardly from the piston permitting the pin 27 to clear the end of the spring 20. The back plate 23 may then be withdrawn radially outwardly through the access opening 30 between the housings 2 and 3. To replace the worn lining with a new lining, a replacement backup plate 23, with a lining thereon, is inserted through the access opening 30 and slid radially inwardly, as shown in FIGURE 7, until the pin 27 passes over the free end of the spring 20 and under the free end of the spring 21. The pin 27 will then be in the position shown in FIGURE 1 with the end of the spring 20 preventing the back plate 23 from moving radially outwardly and with the spring 21 retaining the pin 27 against the end of the spring 20. It will be understood that other forms of stop means other than the spring 20 may be provided. There must be, however, a resilient means to serve the function of the spring 21 in order to permit removal of the lining by flexing sufficiently to allow the back plate 23 to be moved axially away from the piston.

Figure 8:
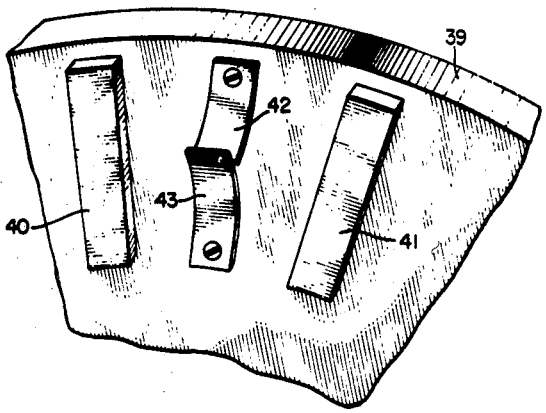
FIGURE 8 is a fragmentary view of another embodiment of the invention.

It will be understood that the fastener means described herein may be used to attach a brake lining not only to a piston, but to a brake disc such as the brake disc 39 shown in FIGURE 8, or other carrier means. When attached to a carrier other than a piston, there must be provided a torque receiving surface adjacent each lateral edge of the back plate to limit the circumferential movement thereof and receive the braking torque forces.

The disc 39 in FIGURE 8 has a pair of torque receiving members 40 and 41 located on each side of the springs 42 and 43. The members 40 and 41 serve the same function as the torque receiving surfaces 33 and 34 on the housing 3 when a back plate is held by the springs 42 and 43 on the disc 39.

Various changes can be made in the illustrative embodiments shown herein without departing from the scope of the invention.

What is claimed is:
1. In a disc brake having at least one rotatable disc, a housing having at least one cylinder adjacent the disc, a piston carried in said cylinder and a brake lining removably attached to the piston and movable with the piston to and from the disc, the improvement comprising:
 (A) a back plate securely attached to the brake lining and having a slot in the exposed face of the plate;
 (B) a pin attached to the back plate extending transversely across the slot; and
 (C) a pair of springs each having one end attached to the outer face of the piston with the free end of one spring overlapping the free end of the other, said springs engaging the pin on the back plate when the back plate is moved radially inwardly across the outer face of the piston, when it is assembled in the housing, the springs preventing the back plate and lining from moving radially outwardly during operation of the brake.

2. The improvement claimed in claim 1 including means attached to the radially outer edge of the back plate to grip the back plate for withdrawal from the brake housing.

3. The improvement claimed in claim 1 wherein torque receiving surfaces are provided on the brake housing to engage opposed edges of the back plate to permit limited circumferential movement of the back plate and lining.

4. The improvement claimed in claim 1 wherein the pin rests against the free end of one spring when the back plate is in a fully inserted position and the other spring overlaps the pin.

5. A fastener for removably attaching a brake lining to a carrier member comprising:
 (A) a back plate attached to the lining;
 (B) a transverse pin attached to the back plate apart of said pin being spaced from said back plate;
 (C) a pair of springs on at least one face of the carrier member for engaging the transverse pin when the back plate is placed adjacent to the carrier member and moved transversely across the face thereof one of said springs being a stop spring with one end of said spring resting against the pin to prevent transverse movement of the lining with respect to the carrier and the other spring overlapping the stop spring and serving as a retaining spring to hold the pin against the end of the stop spring; and
 (D) a pair of torque receiving surfaces on the carrier member for engaging opposed lateral edges of the back plate.

6. The improvement claimed in claim 5 including means attached to an edge of the back plate to facilitate gripping.

References Cited

UNITED STATES PATENTS

| 437,676 | 10/1890 | Carl | 188—244 |
|---|---|---|---|
| 2,767,990 | 10/1956 | Lewell | 287—20 X |
| 3,042,152 | 7/1962 | Butter | 188—73 |
| 3,165,173 | 1/1965 | Thirion | 188—73 |
| 3,189,129 | 6/1965 | Burnett | 188—245 X |

GEORGE E. A. HALVOSA, Primary Examiner

U.S. Cl. X.R.

24—230; 188—244, 250; 287—20